United States Patent [19]

Olszewski et al.

[11] Patent Number: 4,477,344

[45] Date of Patent: Oct. 16, 1984

[54] DEVICE FOR CLARIFICATION OF LIQUIDS AND SEPARATION OF PRECIPITATES

[75] Inventors: Witold Olszewski; Andrzej Lis; Pawel Pietraszek; Franciszek S. Tuznik, all of Warsaw, Poland

[73] Assignee: Instytut Mechaniki Precyzyjnej, Warsaw, Poland

[21] Appl. No.: 438,921

[22] Filed: Nov. 3, 1982

[51] Int. Cl.³ ............................................. B01D 21/00
[52] U.S. Cl. ................................... 210/109; 210/207; 210/262; 210/521; 210/522
[58] Field of Search ..................... 210/521, 522, 532.1, 210/534, 207, 802, 109, 262

[56] References Cited

U.S. PATENT DOCUMENTS

| 2,193,706 | 3/1940 | Attwood | 210/802 |
| 2,264,139 | 11/1941 | Montgomery et al. | 210/521 |

FOREIGN PATENT DOCUMENTS

| 130027 | 3/1978 | Fed. Rep. of Germany | 210/522 |
| 2386328 | 12/1978 | France | 210/522 |
| 92112 | 7/1980 | Japan | 210/521 |
| 446472 | 5/1975 | U.S.S.R. | 210/522 |
| 631455 | 11/1978 | U.S.S.R. | 210/521 |

*Primary Examiner*—Peter Hruskoci
*Assistant Examiner*—John W. Czaja
*Attorney, Agent, or Firm*—Ladas & Parry

[57] ABSTRACT

A device for clarification of liquids and separation of precipitates is characterized by that it comprises a contact chamber 1 above which there is a multi-stream settling tank 2 and below which a chamber 6 for thickening the precipitate is comprised, and comprises an overflow pocket 5 for clarified liquid, the contact chamber 1 has the shape widening upwards, preferably the shape of an inversed cone or an inversed truncated pyramid and the axis of the contact chamber 1 is skew to the level, whereas on the upper edge of the contact chamber 1 an adjustable overflow edge 4 is situated, in the upper part of the multi-stream settling tank 2 there is an outflow unit 7, and the overflow pocket 5 is comprised below the outflow unit 7, the outflow unit 7 is constructed of many uniformly distributed outlet elements 8 which are stub pipes directed upwards and situated on the upper horizontal or inclined surface of the cover plate of the unit 7, the outlet surface of all stub pipes being situated on the same common plane above the plate 9.

2 Claims, 1 Drawing Figure

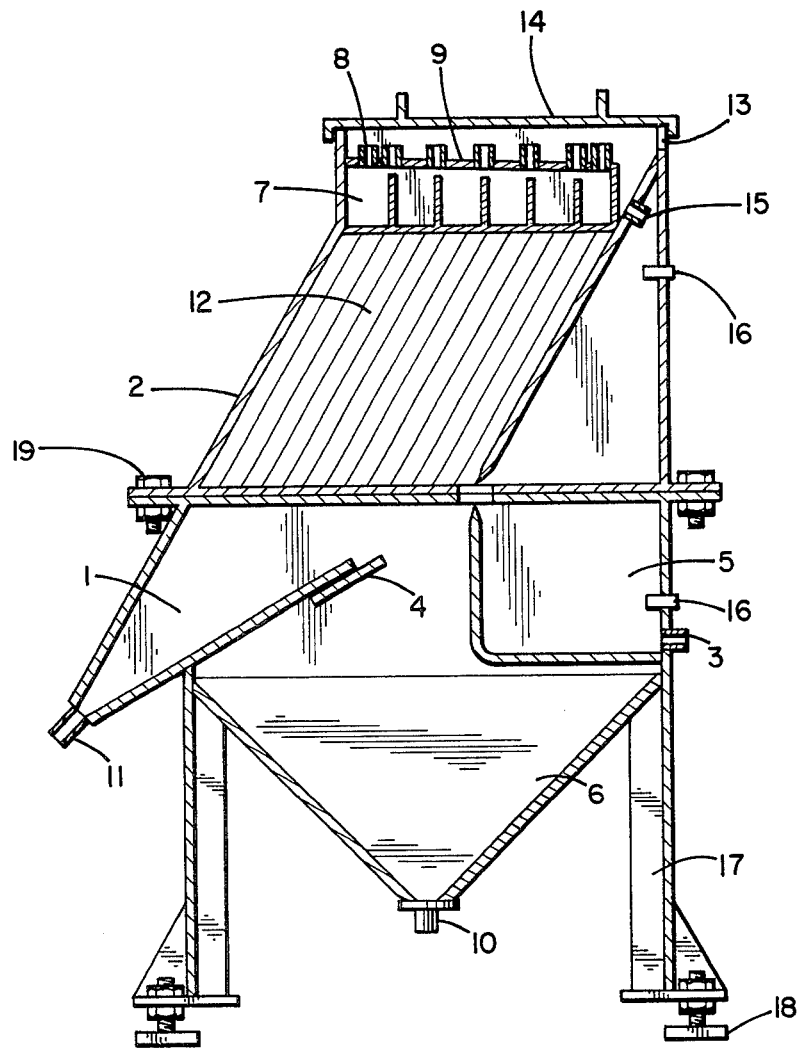

DEVICE FOR CLARIFICATION OF LIQUIDS AND SEPARATION OF PRECIPITATES

The subject of the present invention is a device for clarification of liquids and separation of precipitates. In the device coagulation, flocculation, sedimentation, thickening and separation of precipitates and clarification of liquids proceed. The device serves for conducting chemical reactions, especially for water purification and industrial waste treatment. The device operates in continuous manner. A known device for clarification and separation of precipitates is a multi-stream settling tank. The known settling tank is provided with packets of conduits in which sedimentation of supensions contained in the liquid proceeds. The settling tank of this type is known as thin-layer, skew or lamellar.

From U.S. Pat. Nos. 4,096,063, 4,122,017, 4,110,211 and 4,172,789 and from British patent specifications Nos. 1,452,585 and 1,463,380 there are known devices for clarification of liquids and separation of precipitates comprising a contact chamber, a multi-stream settling tank, a chamber for thickening the precipitate and a container for clarified liquid. In these devices the suspension is separated from the liquid usually in many successive devices of big volume, which causes that both the path and the time technologically necessary for good separation of precipitates are much longer and, besides, the quality of clarified liquid is too low. The efficiency of the known assemblies of devices is not sufficiently high.

From the U.S. Pat. No. 4,136,012 there is known a blocked device for purification of water or industrial waste which is the most similar to the device according to the invention. The interior of the device is divided into 3 chambers connected in series among themselves. The three chambers are separated from one another by skew walls parallel in relation to the skew outer wall. The first chamber serves for neutralization and coagulation, the second for flocculation, and the third is a multi-stream skew lamellar decanter in which the finest particles of the suspension are decanted. The coagulant is introduced into the neutralization chamber, and the flocculant is proportioned along the whole width of the inner skew wall separating the coagulation chamber from the flocculation chamber. In the flocculation chamber there are many skew plates parallel to all other skew walls of the device. In oblique pipes of the decanter laminarization of the flow and settling of the finest particles of the precipitate occur. The sludge is taken off by a stub pipe lying in the lowest part of the device and the clarified liquid by a collector situated above the decanter.

This known device separates from the liquid fractions definite suspensions and precipitates of the size not smaller than from several dozens to a dozen or so micrometers. In order to make this known device separate fractions of definite suspensions and precipitates of the size smaller than a dozen or so micrometers, it would be necessary to increase considerably its volume to lengthen the path of purification of the liquid, to reduce the flow velocity of the purified liquid, and to increase the time for which the liquid remains in the device.

The object of the invention is to design a device for clarification of liquids and separation of precipitates, which at relatively small dimensions will enable increasing the separation yield of suspensions and improving the quality of clarified liquid. The object of the invention is to design a device for separation from liquids fractions of precipitates and suspensions of the size of to several micrometers, for a comparable type of precipitates and suspensions. The object of the invention is also to design a device of dimensions smaller from the known devices but of a little better efficiency and output, as well as to reduce labor and time-consumption of service in comparison with the known devices.

The device for clarification of liquids and separation of precipitates according to the invention comprising a contact chamber, a multi-stream settling tank, a chamber for thickening precipitates and a container for clarified liquid is characterized by that a multi-stream settling tank is situated above the contact chamber, below the contact chamber there is a chamber for thickening the precipitate, a container for clarified liquid is an overflow pocket, the contact chamber is widening upwards, preferably in a shape of an inverted cone or an inverted pyramid, and the axis of the contact chamber is oblique in relation to the level, on the upper edge of the contact chamber there is an adjustable overflow edge, in the upper part of the multi-stream settling tank there is an outflow unit, the overflow pocket is situated below the outflow unit which is constructed from many uniformly distributed outflow elements which are stub pipes directed upwards and situated on the upper horizontal or inclined surface of a cover plate of the outflow unit, whereby the outlet surface of all stub pipes is situated on the same common plane above the plate, and legs of the device comprise leveling screws.

It is preferable if the contact chamber is filled with tower packings.

What is especially significant in the solution of the device according to the invention is the configuration of the contact chamber, the way of situating the contact chamber in relation to the multi-stream settling tank, the possibility of adjusting the size of the contact chamber by means of a slidable overflow edge and the way of solving the outflow unit of clarified liquid.

The device according to the invention has such a significant advantage as removing from purified liquid suspensions and precipitates of the size of up to about 1 micrometer. In comparison with the known devices of the same quantities, the device according to the invention removes additionally suspensions and precipitates of the sizes of from about 25–30 micrometers to about 1 micrometer. The amount of suspensions precipitated in purified liquid in the device according to the invention is increased from several to a dozen or so percent in relation to the known devices of the same size.

It is indicated that proportioning of reactants assisting the process of separation of suspensions and clarification of liquid, for example, a flocculant, is added directly into the conduit supplying contaminated liquid to the device. The reactant thus introduced is mixed in the conduit with clarified liquid in the path of the inflow to the contact chamber. The shape of the contact chamber widening upwards enables slow decrease of the flow velocity till the velocity close to the flow velocity of liquid along the sedimentation conduit in the multi-stream settling tank. During the flow of liquid with the precipitate through the contact chamber in the first phase in the inlet zone coagulation and/or flocculation and/or clarification of suspensions of precipitates through the contact with previously formed suspension filling the contact chamber occur. In certain conditions in the outlet zone of the contact chamber the suspension forms a small layer of suspended precipitate through which the liquid being clarified flows at a small velocity, for which the further process of the separation of the remainder of precipitates proceeds in the settling tank performing the function of a device finally purifying the liquid and stabilizing the work of the contact chamber. The precipitate from the contact chamber and the multi-stream settling tank passing over the adjustable overflow edge situated on the upper edge of the contact chamber gets into the chamber for thickening the precipitate, wherefrom after preliminary thickening it proceeds for further processing. Clarified liquid flows out from the multi-stream settling tank through the outflow unit to the overflow pocket of purified liquid. The outflow unit comprises uniformly arranged outlet elements which are stub pipes directed upwards. Stub pipes are situated on the upper surface of the outflow unit of the multi-stream settling tank in the cover plate. The outlet surface of all stub pipes is situated in the same common plane protruding above the plate. Such a design enables forcing a uniform flow of liquid through the settling tank and also making independent the outlet from particular stub pipes, and uniform outflow of clarified liquid from the whole surface of the settling tank. Leveling of outlets of the stub pipes is performed by means of levelling screws, whereas the cover plate can be horizontal or inclined, which enables different location of outflow stub pipes in particular outflow planes, depending on the type and the flow of liquid.

The device according to the invention is presented in an example of its realisation in the drawing.

A contact chamber 1 is situated under a multi-stream settling tank 2 and has an adjustable (slidable) overflow edge 4. The device has also an overflow pocket 5 situated above thickening chamber 6 and under the outflow unit 7, with outlet stub pipes 8 and a cover plate 9. The thickening chamber 6 has in its lower part a draining valve 10 and the contact chamber 1 has an outlet stub pipe 11. The settling tank 2 is provided with a laminar unit which is a lamellar-skew pack 12. The outflow unit 7 has also a venting hole 13, a cover 14 and an outflow hole 15. The overflow pocket has level signalling devices 16 and an outlet stub pipe 3. The device is set up at four legs 17 provided with leveling screws 18. The upper part of the device with the settling tank 2 and the outflow unit 7 is connected with the other lower part of the device by means of clamping screws 19.

The device is made of steel and protected by a chemo-resistant paint coating. The lamellar pack 12 and the cover plate 9 are made of PVC. Dimensions of the device are: length—1800 mm, width—1000 mm, height—2200 mm. Through the device a suspension of zinc hydroxide $Zn(OH)_2$ of a concentration of 500 g/m$^3$ and hydration of 98.5% was let pass. At a flow through the device equal to 1.0 m$^3$/hour and with the use of an anion flocculant prepared on the basis of polyacrylamides—known under the trade name "Rokrysol WF-2"—a removal of 97% of suspensions was obtained. The temperature of purified liquid was 23° C.

What is claimed is:

1. In a device for clarification of liquids and separation of precipitate materials, comprising a frame, a contact chamber mounted on said frame having a conical shape widening in the upward direction, a settling tank mounted above said contact chamber and having means for passing multiple streams of fluids therethrough, outflow means mounted above said settling tank for recovery of clarified liquids, a thickening chamber mounted on said frame below said contact chamber, the improvements which are characterized in that said contact chamber is in the shape of an inverted irregular tapered wall chamber in the form of a pyramid, cone, or the like and arranged with an oblique axis inclined relative to the horizontal at an acute angle, the upper inner edge of said contact chamber having mounted thereon an adjustable overflow means to effectively change the base of the oblique shaped contact chamber to vary the capacity thereof, said settling tank having a plurality of laminar sheets arranged in an assembly providing multiple flow paths at an oblique angle relative to the horizontal, said outflow means including an outlet unit having a plurality of outflow chamber elements, each of which includes means for passing several of said multiple streams of liquid flowing from beneath through said settling tank, said outflow elements having in the upper portions thereof a corresponding outlet conduit directed upwardly and mounted in an inclined cover plate mounted above said outlet units, each said outlet conduit having an upper end terminating in a common horizontal plane above said inclined cover plate, and an overflow pocket means situated between said settling tank and said thickening chamber laterally offset from said contact chamber for collection of clarified liquids including level sensing means therein and outflow means provided in said outflow pocket.

2. The device according to claim 1, wherein said contact chamber is filled with tower packings.

* * * * *